(12) United States Patent
Hatada

(10) Patent No.: US 10,895,722 B2
(45) Date of Patent: Jan. 19, 2021

(54) ZOOM LENS AND IMAGE PICKUP APPARATUS

(71) Applicant: CANON KABUSHIKI KAISHA, Tokyo (JP)

(72) Inventor: Takahiro Hatada, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 165 days.

(21) Appl. No.: 16/019,818

(22) Filed: Jun. 27, 2018

(65) Prior Publication Data

US 2019/0004295 A1 Jan. 3, 2019

(30) Foreign Application Priority Data

Jul. 3, 2017 (JP) ................................. 2017-130185

(51) Int. Cl.
| | | |
|---|---|---|
| *G02B 15/163* | (2006.01) | |
| *G02B 15/20* | (2006.01) | |
| *G02B 27/64* | (2006.01) | |
| *G02B 15/173* | (2006.01) | |
| *G02B 15/14* | (2006.01) | |

(52) U.S. Cl.
CPC ......... *G02B 15/163* (2013.01); *G02B 15/146* (2019.08); *G02B 15/1461* (2019.08);
(Continued)

(58) Field of Classification Search
CPC ... G02B 7/04; G02B 9/34; G02B 9/60; G02B 9/62; G02B 9/64; G02B 13/0045;
(Continued)

(56) References Cited

U.S. PATENT DOCUMENTS

| 9,684,155 B2 | 6/2017 | Hatada | |
|---|---|---|---|
| 2013/0335830 A1* | 12/2013 | Tashiro | G02B 15/14 359/683 |

(Continued)

FOREIGN PATENT DOCUMENTS

| CN | 1424613 A | 6/2003 |
|---|---|---|
| CN | 1580856 A | 10/2005 |

(Continued)

OTHER PUBLICATIONS

Japanese Office Action for application No. 2017130185 dated Apr. 16, 2019 with English translation.

(Continued)

*Primary Examiner* — Marin Pichler
(74) *Attorney, Agent, or Firm* — Carter, DeLuca & Farrell LLP

(57) ABSTRACT

The zoom lens according to the present invention consists of, in order from an object side to an image side, a positive first lens unit, a negative second lens unit, and a positive rear unit including at least four lens units. The second lens unit moves toward the object side during zooming from a wide angle end to a telephoto end, and an interval between each pair of adjacent lens units is changed during zooming. The rear unit includes a positive lens unit LP, which is arranged closest to the image side. Focal lengths of the zoom lens at the wide angle end and at the telephoto end, focal lengths of the first lens unit and the second lens unit, and a distance from the lens surface of the lens unit LP on the image side to an image plane at the telephoto end are each set appropriately.

12 Claims, 9 Drawing Sheets

(52) U.S. Cl.
CPC ............ *G02B 15/173* (2013.01); *G02B 15/20* (2013.01); *G02B 27/646* (2013.01)

(58) Field of Classification Search
CPC ...... G02B 13/22; G02B 15/14; G02B 15/142; G02B 15/1425; G02B 15/143503; G02B 15/144; G02B 15/1445; G02B 15/144507; G02B 15/144511; G02B 15/145; G02B 15/145113; G02B 15/145117; G02B 15/145513; G02B 15/146; G02B 15/1461; G02B 15/177; G02B 15/163; G02B 15/173; G02B 15/20; G02B 27/646
USPC .......................................... 359/676, 686, 557
See application file for complete search history.

(56) References Cited

U.S. PATENT DOCUMENTS

2016/0062096 A1   3/2016   Hatada
2016/0349492 A1*  12/2016  Maetaki ................. G02B 15/22

FOREIGN PATENT DOCUMENTS

| | | |
|---|---|---|
| CN | 103513406 A | 1/2014 |
| CN | 104583835 A | 4/2015 |
| JP | H06194574 A | 7/1994 |
| JP | 2013257507 A | 12/2013 |
| JP | 2014006354 A | 1/2014 |
| JP | 2015210371 A | 11/2015 |
| JP | 2016071179 A | 5/2016 |
| JP | 2016071283 A | 5/2016 |
| JP | 2016224157 A | 12/2016 |

OTHER PUBLICATIONS

Chinese Office Action for application No. 201810710622.1 dated Oct. 26, 2020 with English Translation.

\* cited by examiner

ZOOM LENS AND IMAGE PICKUP APPARATUS

BACKGROUND OF THE INVENTION

Field of the Invention

The present invention relates to a zoom lens and an image pickup apparatus, which are suitable for an image pickup apparatus using an image pickup element, for example, a video camera, an electronic still camera, a broadcasting camera, or a monitoring camera.

Description of the Related Art

In recent years, an image pickup optical system for use in an image pickup apparatus has been required to be, for example, a zoom lens having a short total length of zoom lens, a compact (small) size, and a high zoom ratio (high magnification-varying ratio). As a zoom lens meeting those demands, there has been known a positive lead-type zoom lens in which a lens unit having a positive refractive power is arranged closest to an object side. Further, in order to perform quick focusing, a focus lens system is required to be small in size and weight, for example.

Hitherto, as the positive lead-type zoom lens in which the lens unit having a positive refractive power is arranged closest to the object side, there has been known a zoom lens having a relatively high zoom ratio and using a lens unit that is arranged on the object side and is different from the first lens unit to perform focusing. Further, in general, the entire system of a zoom lens having a high zoom ratio tends to be large in size, and the zoom lens also tends to have a high weight.

When the zoom lens is increased in size and weight, the zoom lens may often be vibrated during photographing due to camera shake or other reasons. When the zoom lens is vibrated and inclined, a photographed image (imaging position) is displaced (image blurs) by an amount corresponding to an inclination angle of the zoom lens and a focal length at a zoom position at that time. That is, an image blur occurs. There has been known a zoom lens in which, as a unit configured to correct the image blur that occurs at that time (unit having an image stabilizing function), a part of the lens system is configured to shift in a direction perpendicular to an optical axis.

Hitherto, there has been known a so-called positive lead-type zoom lens including, in order from an object side to an image side, a first lens unit having a positive refractive power, a second lens unit having a negative refractive power, and a rear unit having a positive refractive power as a whole, in which an interval between each pair of lens units is changed for zooming. As such a zoom lens, there has been known a zoom lens including an image stabilizing lens system and further using an inner-focus system in which a lens system arranged on the image side of an aperture stop is configured to move to perform focusing (Japanese Patent Application Laid-Open No. 2016-71179).

In the positive lead-type zoom lens, it is relatively easy to increase the zoom ratio while downsizing the entire system of the zoom lens. In a positive lead-type zoom lens consisting of, in order from an object side to an image side, a first lens unit having a positive refractive power, a second lens unit having a negative refractive power, and a rear unit including at least one lens unit subsequent thereto, the second lens unit is mainly responsible for a magnification varying action. Further, an effective diameter of the first lens unit, a lens unit thickness of the first lens unit, and other sizes greatly affect the size of the entire zoom lens.

Therefore, in the positive lead-type zoom lens, in order to obtain high optical performance over the entire zoom range at a high zoom ratio while downsizing the entire system of the zoom lens, it is important to appropriately set, for example, a refractive power and a lens configuration of each of the first lens unit and the second lens unit. It is further important to appropriately set a lens configuration of the rear unit including a plurality of lens units arranged on the image side of the second lens unit.

Moreover, it is important to appropriately set, for example, movement conditions such as a direction and an amount of movement of each of the first lens unit and the second lens unit during zooming. Unless those configurations are appropriately set, it becomes difficult to obtain a zoom lens having high optical performance over the entire zoom range at a high zoom ratio while the entire system of the zoom lens is downsized.

SUMMARY OF THE INVENTION

According to one aspect of the present invention, there is provided a zoom lens consisting of, in order from an object side to an image side: a first lens unit having a positive refractive power; a second lens unit having a negative refractive power; and a rear unit including at least four lens units and having a positive refractive power as a whole, wherein the second lens unit is configured to move toward the object side and an interval between each pair of adjacent lens units is changed during zooming from a wide angle end to a telephoto end, wherein the rear unit includes a lens unit LP having a positive refractive power, which is arranged closest to the image side, and wherein the following conditional expressions are satisfied:

$$0.7 < f1/ft < 1.2;$$

$$0.7 < |f2/fw| < 1.0; \text{ and}$$

$$0.1 < dLP/ft < 0.4,$$

where "fw" represents a focal length of the zoom lens at the wide angle end, "ft" represents a focal length of the zoom lens at the telephoto end, f1 represents a focal length of the first lens unit, f2 represents a focal length of the second lens unit, and dLP represents a distance from a lens surface of the lens unit LP on the image side to an image plane at the telephoto end.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Exemplary embodiments of the present invention are now described in detail with reference to the accompanying drawings. A zoom lens according to each Example of the present invention includes, in order from an object side to an image side, a first lens unit having a positive refractive power, a second lens unit having a negative refractive power, and a rear unit including at least four lens units and having a positive refractive power as a whole. During zooming from a wide angle end to a telephoto end, the second lens unit moves toward the object side, and an interval between each pair of adjacent lens units is changed.

Figure 1:
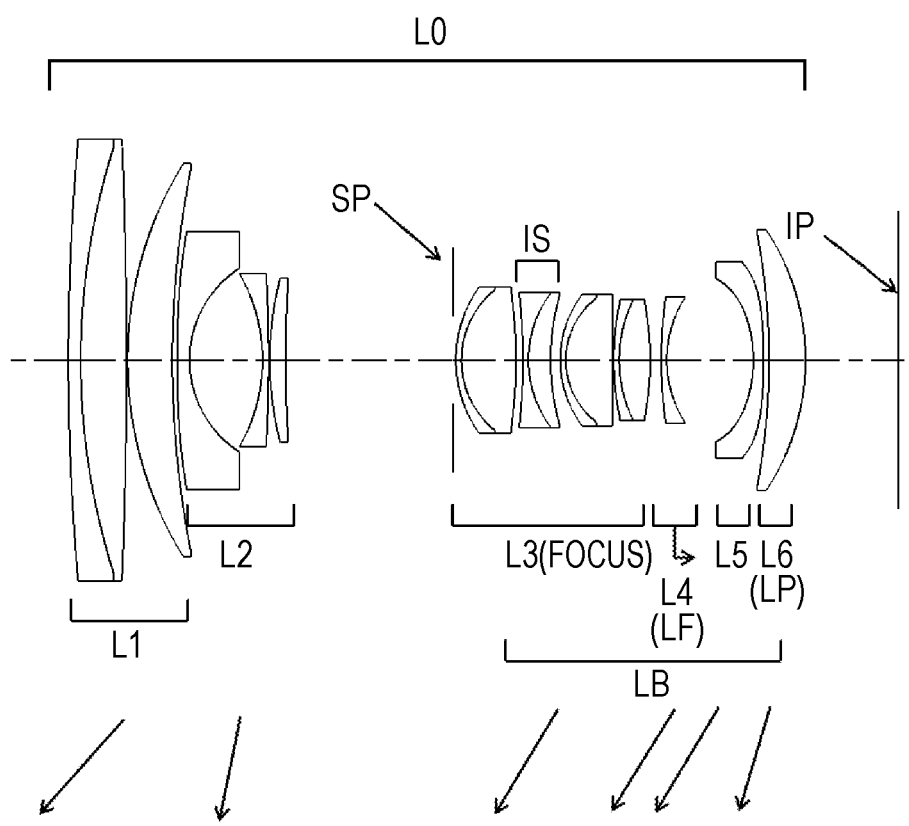
FIG. 1 is a cross-sectional view of a zoom lens according to Example 1 of the present invention at a wide angle end.
Figure 2A:
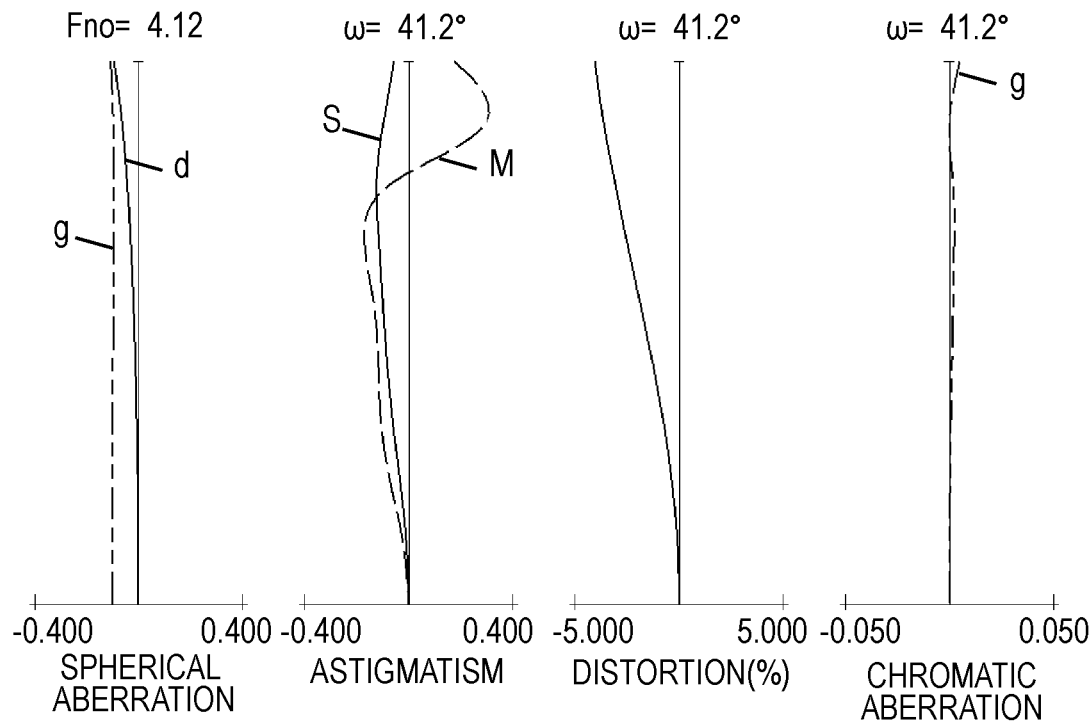
FIG. 2A is aberration diagrams of the zoom lens according to Example 1 at the wide angle end.
Figure 2B:
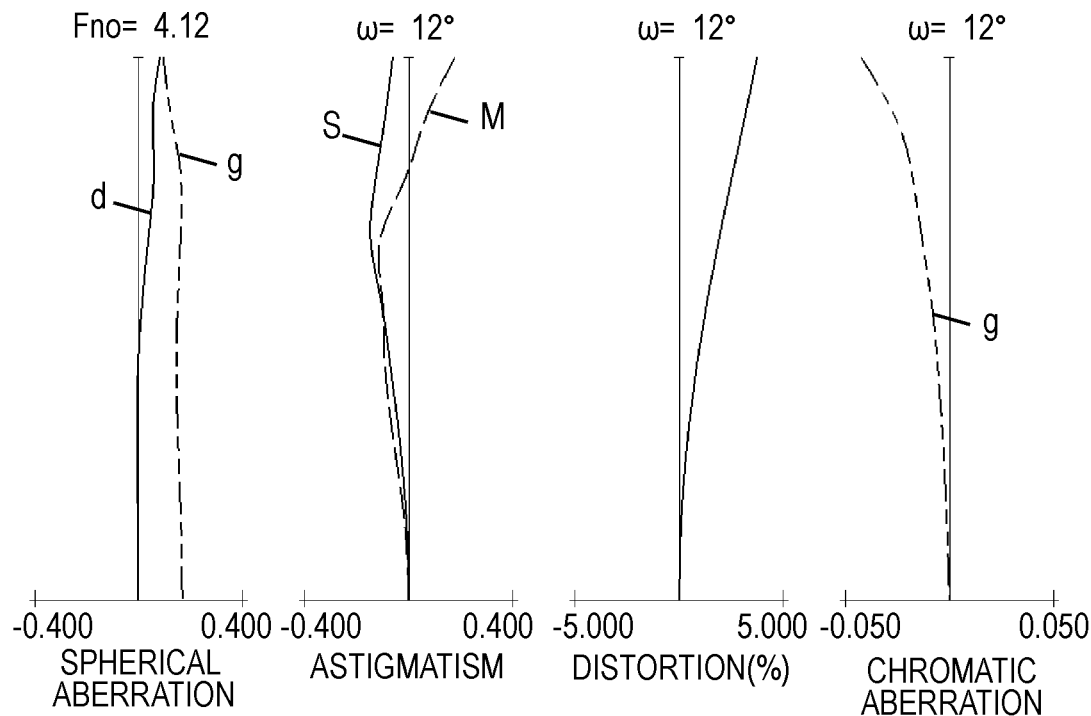
FIG. 2B is aberration diagrams of the zoom lens according to Example 1 at a telephoto end.
Figure 3:
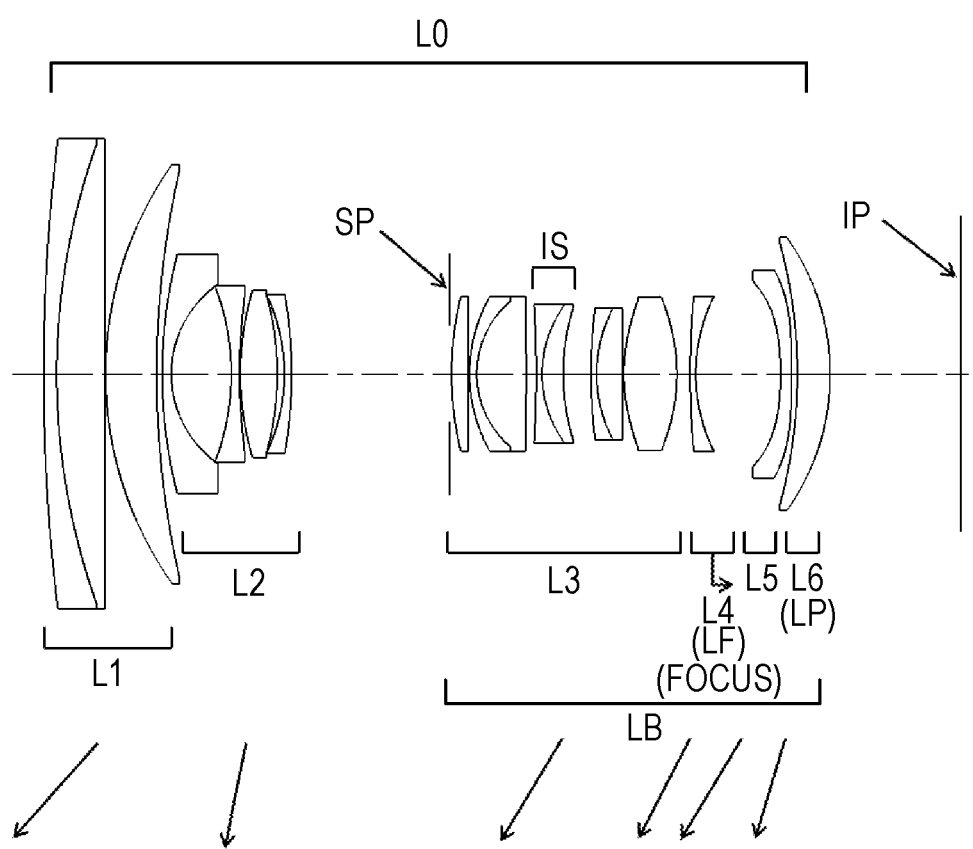
FIG. 3 is a cross-sectional view of a zoom lens according to Example 2 of the present invention at a wide angle end.
Figure 4A:
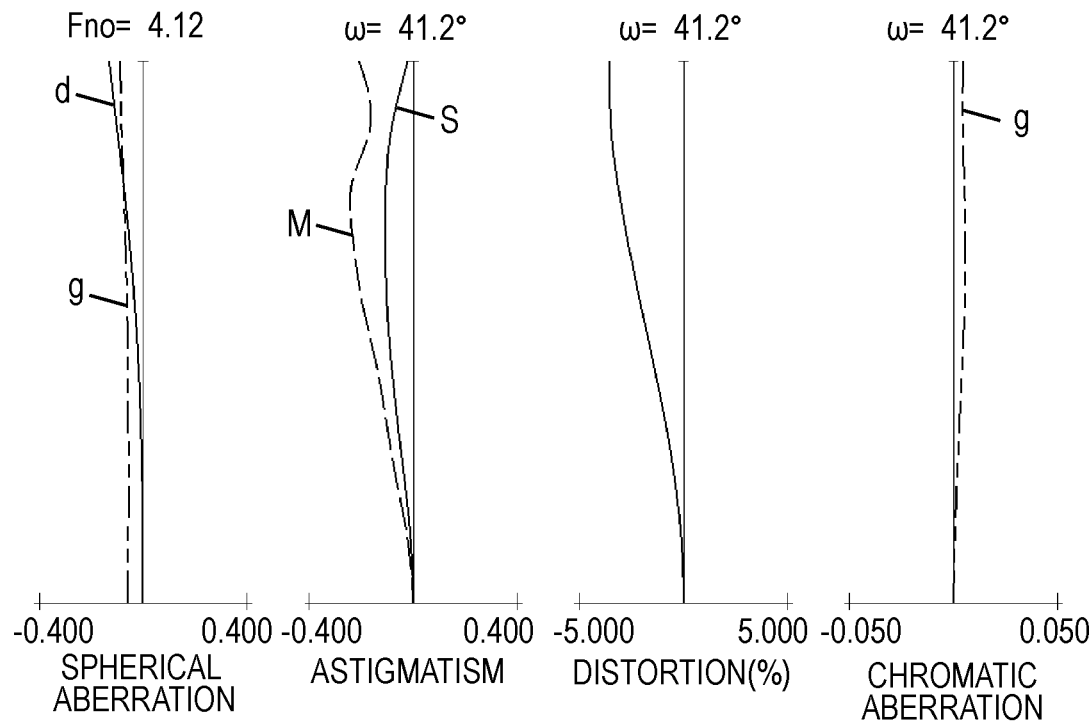
FIG. 4A is aberration diagrams of the zoom lens according to Example 2 at the wide angle end.
Figure 4B:
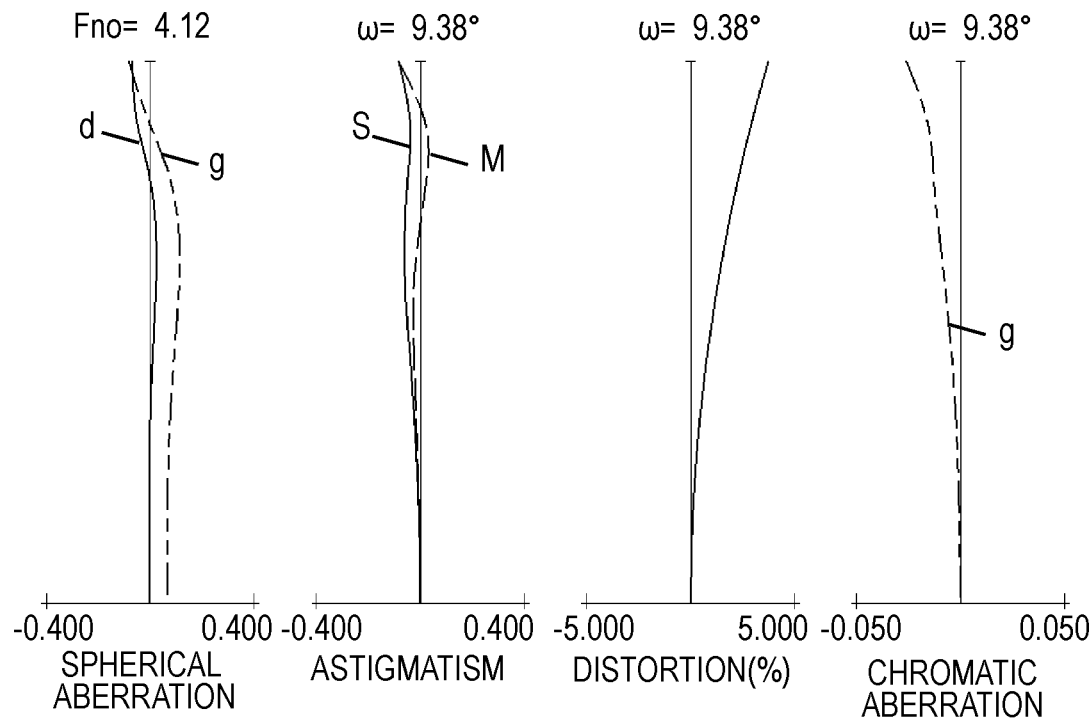
FIG. 4B is aberration diagrams of the zoom lens according to Example 2 at a telephoto end.

FIG. 1 is a lens cross-sectional view of a zoom lens according to Example 1 of the present invention at a wide angle end (short focal length end). FIG. 2A and FIG. 2B are aberration diagrams of the zoom lens according to Example 1 at the wide angle end and a telephoto end (long focal length end), respectively. Example 1 represents a zoom lens having a zoom ratio of 4.12 and an F-number of 4.12. FIG. 3 is a lens cross-sectional view of a zoom lens according to Example 2 of the present invention at a wide angle end. FIG. 4A and FIG. 4B are aberration diagrams of the zoom lens according to Example 2 at the wide angle end and a telephoto end, respectively. Example 2 represents a zoom lens having a zoom ratio of 4.12 and an F-number of 4.12.

Figure 5:
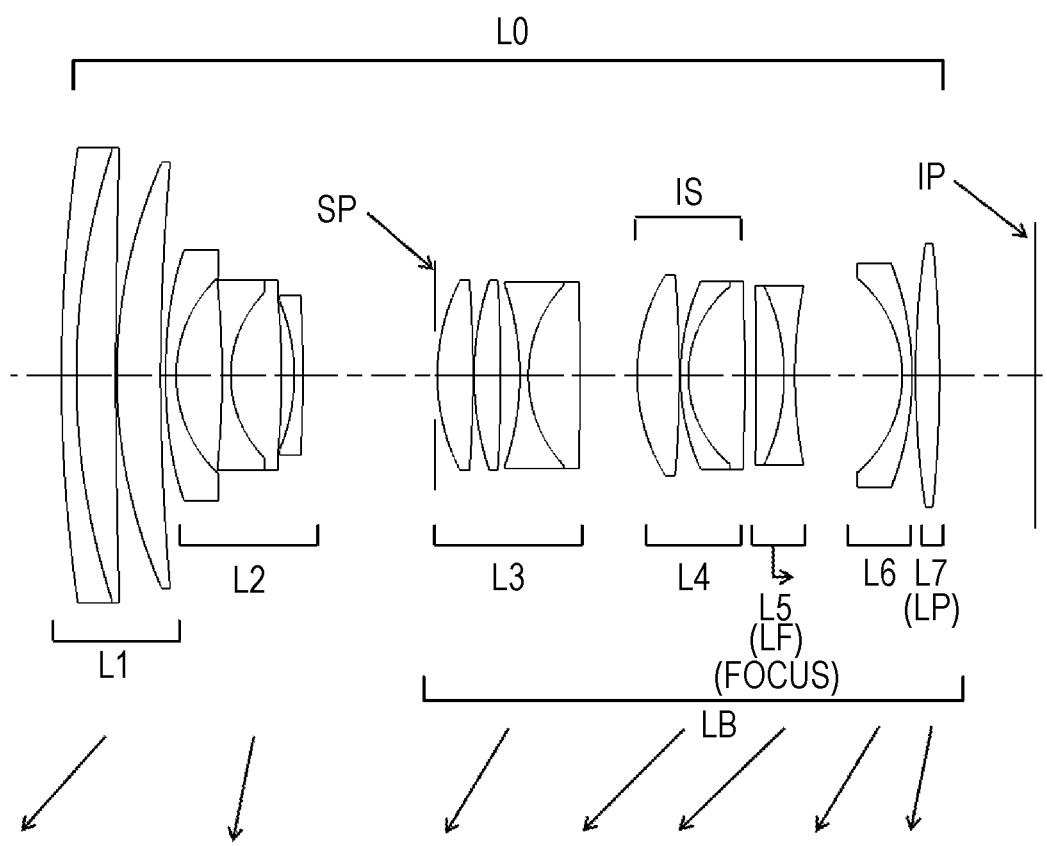
FIG. 5 is a cross-sectional view of a zoom lens according to Example 3 of the present invention at a wide angle end.
Figure 6A:
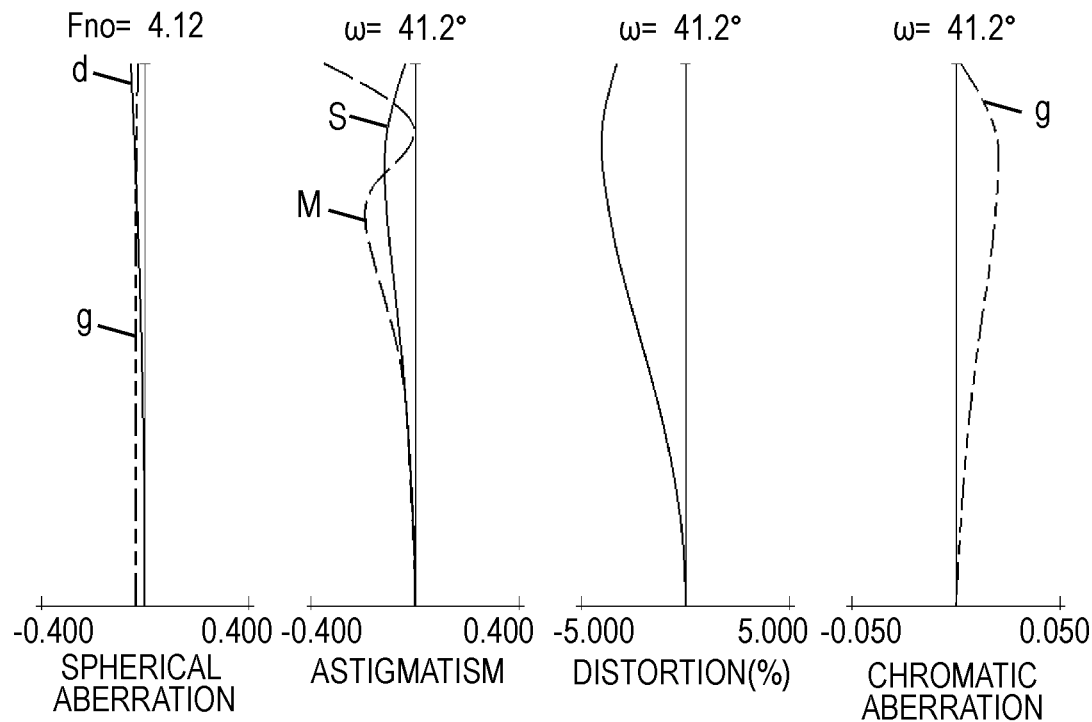
FIG. 6A is aberration diagrams of the zoom lens according to Example 3 at the wide angle end.
Figure 6B:
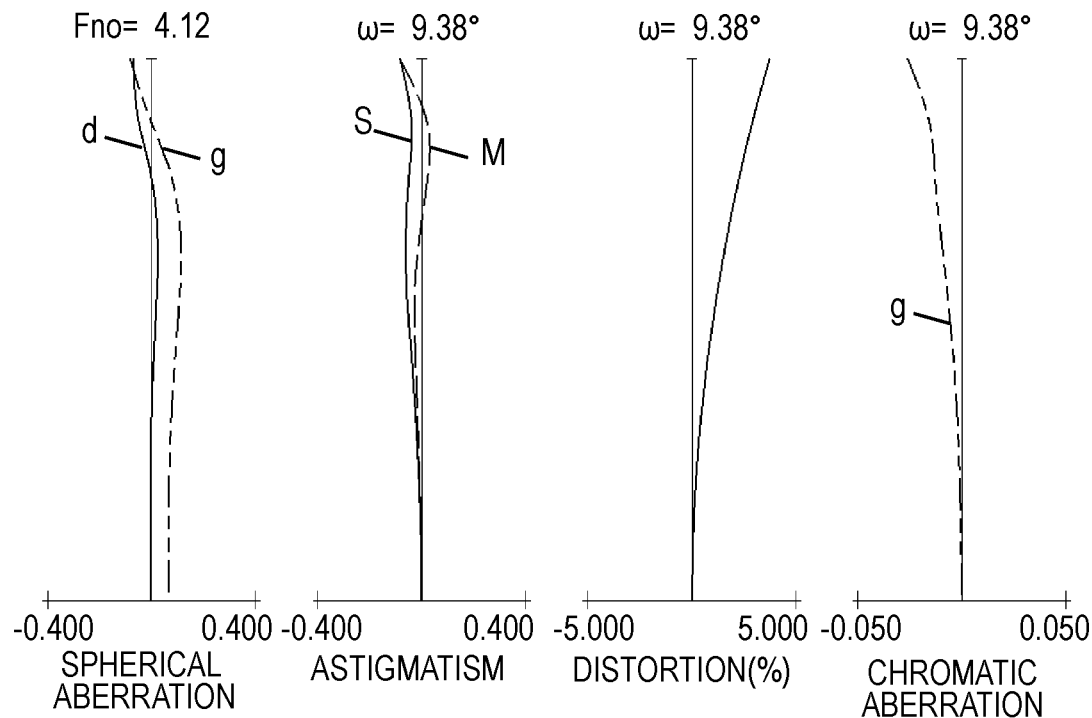
FIG. 6B is aberration diagrams of the zoom lens according to Example 3 at a telephoto end.
Figure 7:
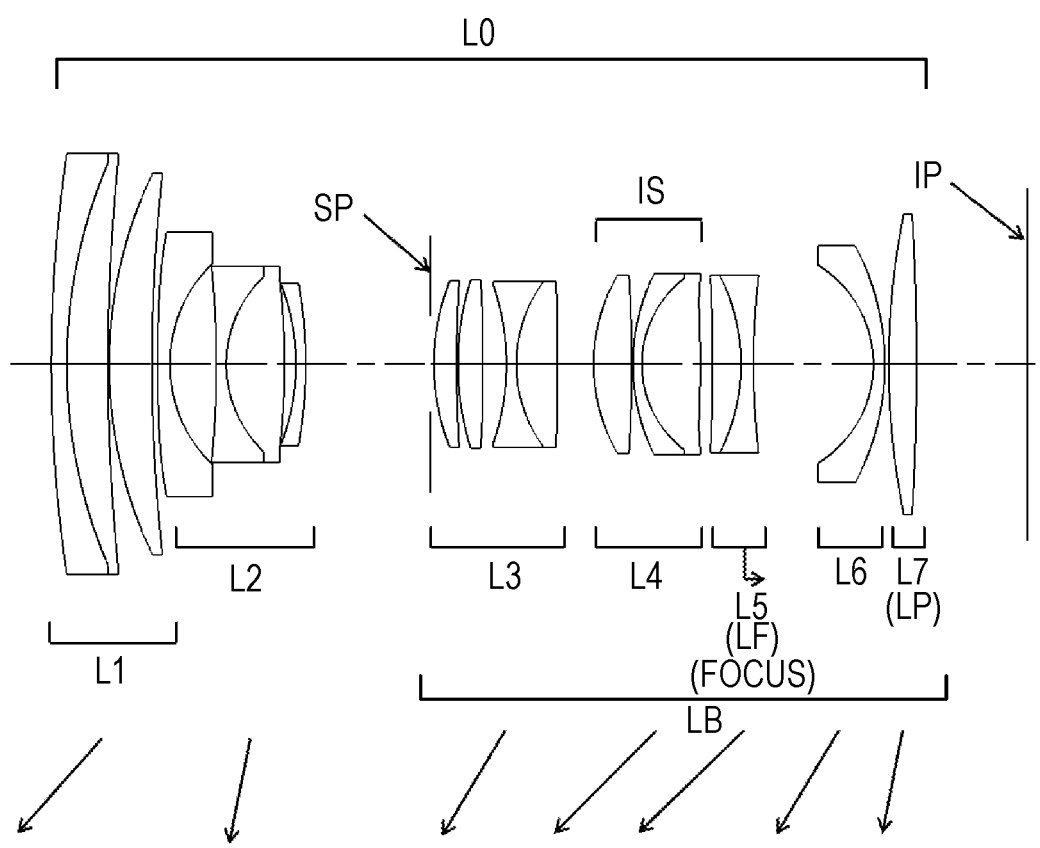
FIG. 7 is a cross-sectional view of a zoom lens according to Example 4 of the present invention at a wide angle end.
Figure 8A:
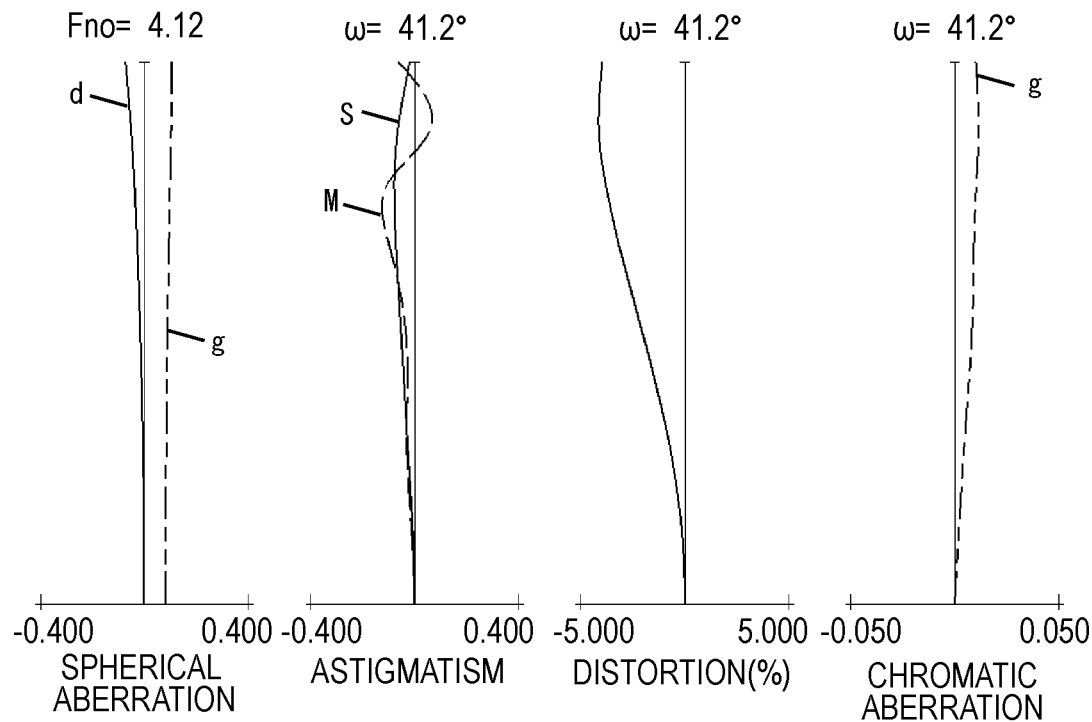
FIG. 8A is aberration diagrams of the zoom lens according to Example 4 at the wide angle end.
Figure 8B:
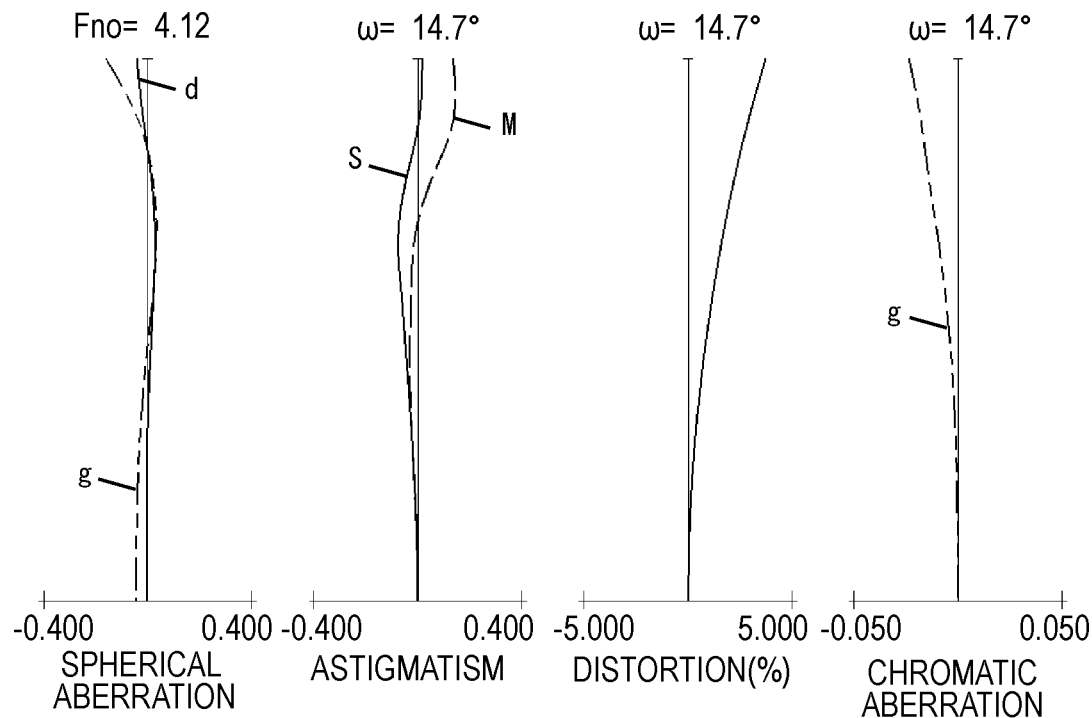
FIG. 8B is aberration diagrams of the zoom lens according to Example 4 at a telephoto end.
Figure 9:
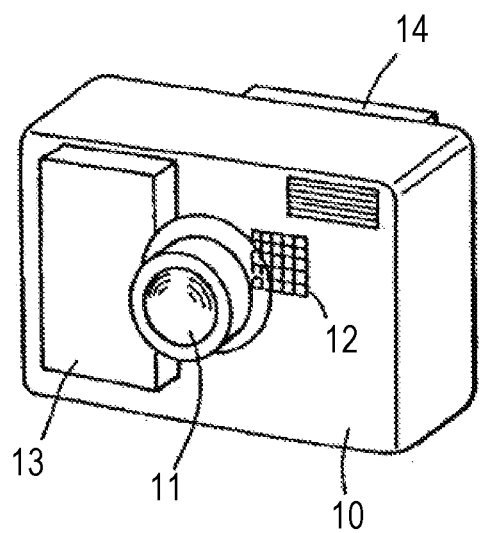
FIG. 9 is a schematic view of a main part of an image pickup apparatus according to one embodiment of the present invention.

FIG. 5 is a lens cross-sectional view of a zoom lens according to Example 3 of the present invention at a wide angle end. FIG. 6A and FIG. 6B are aberration diagrams of the zoom lens according to Example 3 at the wide angle end and a telephoto end, respectively. Example 3 represents a zoom lens having a zoom ratio of 5.30 and an F-number of 4.12. FIG. 7 is a lens cross-sectional view of a zoom lens according to Example 4 of the present invention at a wide angle end. FIG. 8A and FIG. 8B are aberration diagrams of the zoom lens according to Example 4 at the wide angle end and a telephoto end, respectively. Example 4 represents a zoom lens having a zoom ratio of 3.34 and an F-number of 4.12. FIG. 9 is a schematic view of a main part of an image pickup apparatus according to one embodiment of the present invention.

The zoom lens according to each Example is an image pickup optical system for use in image pickup apparatus such as a video camera, a digital camera, a monitoring camera, and a television (TV) camera.

In the lens cross-sectional views, the left side is the object side (front), and the right side is the image side (rear). In the lens cross-sectional views, the zoom lens is represented by L0. The order of a lens unit from the objet side is represented by "i", and the i-th lens unit is represented by Li. A rear unit LB includes at least four lens units. An aperture stop is represented by SP. An image stabilizing lens system IS is configured to move in a direction containing a component in a direction perpendicular to the optical axis to correct an image blur that occurs when the entire zoom lens is vibrated. A focus lens system LF is configured to move during focusing.

At an image plane IP, an image pickup surface of an image pickup element (photoelectric conversion element) such as a CCD sensor or a CMOS sensor is placed when the zoom lens is used as an image pickup optical system of a video camera or a digital still camera. The arrows indicate movement loci of the respective lens units during zooming from the wide angle end to the telephoto end. The arrow relating to focus indicates a direction of movement of the focus lens system LF during focusing from infinity to close distance.

In the lens cross-sectional views of the zoom lenses of FIG. 1 and FIG. 3, there are illustrated a first lens unit L1 having a positive refractive power, a second lens unit L2 having a negative refractive power, a third lens unit L3 having a positive refractive power, a fourth lens unit L4 having a negative refractive power, a fifth lens unit L5 having a negative refractive power, and a sixth lens unit L6 having a positive refractive power. The rear unit LB consists of the third lens unit L3 to the sixth lens unit L6. The sixth lens unit L6 corresponds to a lens unit LP having a positive refractive power, which is positioned closest to the image side of the zoom lens.

As illustrated in FIG. 1 and FIG. 3, in the zoom lenses according to Examples 1 and 2, the first lens unit L1 is configured to move toward the object side as indicated by the arrow during zooming from the wide angle end to the telephoto end. The second lens unit L2 is configured to move toward the object side while increasing an interval between the first lens unit L1 and the second lens unit L2. The third lens unit L3 is configured to move toward the object side while decreasing an interval between the second lens unit L2 and the third lens unit L3. The fourth lens unit L4 is configured to move toward the object side while increasing and then decreasing an interval between the third lens unit L3 and the fourth lens unit L4. The fifth lens unit L5 is configured to move toward the object side while decreasing and then increasing an interval between the fourth lens unit L4 and the fifth lens unit L5.

The sixth lens unit L6 is configured to move toward the object side while increasing an interval between the fifth lens unit L5 and the sixth lens unit L6. The fourth lens unit L4 is configured to move toward the image side during focusing from infinity to close distance.

In the lens cross-sectional views of the zoom lenses of FIG. 5 and FIG. 7, there are illustrated a first lens unit L1 having a positive refractive power, a second lens unit L2 having a negative refractive power, a third lens unit L3 having a positive refractive power, a fourth lens unit L4 having a positive refractive power, and a fifth lens unit L5 having a negative refractive power. There are also illustrated a sixth lens unit L6 having a negative refractive power and a seventh lens unit L7 having a positive refractive power. The rear unit LB consists of the third lens unit L3 to the seventh lens unit L7. The seventh lens unit L7 corresponds to a lens unit LP having a positive refractive power, which is positioned closest to the image side.

As illustrated in FIG. 5 and FIG. 7, in the zoom lenses according to Examples 3 and 4, the first lens unit L1 is configured to move toward the object side as indicated by the arrow during zooming from the wide angle end to the telephoto end. The second lens unit L2 is configured to move toward the object side while increasing an interval between the first lens unit L1 and the second lens unit L2. The third lens unit L3 is configured to move toward the object side while decreasing an interval between the second lens unit L2 and the third lens unit L3. The fourth lens unit L4 is configured to move toward the object side while decreasing an interval between the third lens unit L3 and the fourth lens unit L4. The fifth lens unit L5 is configured to move toward the object side while increasing and then decreasing an interval between the fourth lens unit L4 and the fifth lens unit L5.

The sixth lens unit L6 is configured to move toward the object side while increasing an interval between the fifth lens unit L5 and the sixth lens unit L6. The seventh lens unit L7 is configured to move toward the object side while increasing an interval between the sixth lens unit L6 and the seventh lens unit L7. The fifth lens unit L5 is configured to move toward the image side during focusing from infinity to close distance. In this case, the refractive power refers to an optical power, and is a reciprocal of the focal length.

In the zoom lenses according to Examples 1 and 2, a part of the lens system forming the third lens unit L3 is configured to move in a direction containing a component in a direction perpendicular to the optical axis as the image stabilizing lens system IS to correct an image blur. In the zoom lenses according to Examples 3 and 4, the fourth lens unit L4 is configured to entirely move in the direction containing the component in the direction perpendicular to the optical axis as the image stabilizing lens system IS to correct an image blur.

In each Example, the aperture stop SP is arranged on the object side of the third lens unit L3. In each Example, the wide angle end and the telephoto end refer to zoom positions obtained when each lens unit is positioned at both ends in a range in which the lens unit is mechanically movable on the optical axis.

In the spherical aberration diagrams among the aberration diagrams, a solid line "d" indicates a d-line (wavelength: 587.6 nm), and a long dashed double-short dashed line "g" indicates a g-line (wavelength: 435.8 nm). In the astigmatism diagrams, a dotted line M indicates a meridional image plane at the d-line, and a solid line S indicates a sagittal image plane at the d-line. The lateral chromatic aberration at the g-line is shown. Symbol "co" represents a half angle of view (value of half of an image pickup angle of view) (degrees), and symbol Fno represents an F-number.

Next, features of each Example are described. The zoom lens according to each Example of the present invention consists of, in order from an object side to an image side, a first lens unit having a positive refractive power, a second lens unit having a negative refractive power, and a rear unit LB including at least four lens units and having a positive refractive power as a whole over the entire zoom range.

In general, in order to downsize the lens unit, it is required to reduce a lens outer diameter (lens effective diameter). In order to reduce the lens outer diameter, it is required to cause light rays entering the lens unit to sufficiently converge on a light incidence side of the lens unit. This state can be achieved by simply arranging a lens unit having a strong positive refractive power on the object side of the lens unit.

In each Example, the first lens unit L1 and the second lens unit L2 are configured to move so that the interval between the first lens unit L1 and the second lens unit L2 becomes larger at the telephoto end as compared to the wide angle end during zooming. In this manner, a sufficiently long distance is easily ensured for an axial ray exiting from the first lens unit L1 to converge at the telephoto end, at which a diameter of the axial ray increases. Thus, downsizing of each lens unit subsequent thereto is facilitated.

In each Example, the rear unit LB includes the lens unit LP having a positive refractive power, which is arranged closest to the image side. A focal length of the zoom lens at the wide angle end is represented by "fw", a focal length of the zoom lens at the telephoto end is represented by "ft", a focal length of the first lens unit L1 is represented by f1, a focal length of the second lens unit L2 is represented by f2, and a distance from a lens surface of the lens unit LP on the image side to the image plane at the telephoto end is represented by dLP. At this time, the following conditional expressions are satisfied.

$$0.7 < f1/ft < 1.2 \quad (1)$$

$$0.7 < |f2/fw| < 1.0 \quad (2)$$

$$0.1 < dLP/ft < 0.4 \quad (3)$$

Next, technical meanings of the above-mentioned conditional expressions are described. Conditional Expression (1) defines the focal length of the first lens unit L1. When a ratio exceeds the upper limit of Conditional Expression (1) and the positive refractive power of the first lens unit L1 is excessively decreased, the amount of movement of the first lens unit L1 is required to be increased for magnification varying. As a result, the total length of zoom lens is disadvantageously increased at the telephoto end. Further, it becomes difficult to decrease the effective diameter of a front lens element. When the ratio falls below the lower limit of Conditional Expression (1) and the positive refractive power of the first lens unit L1 is excessively increased, the zoom ratio can be easily increased, but it becomes difficult to correct a spherical aberration at the telephoto end.

Conditional Expression (2) defines the focal length of the second lens unit L2. When Conditional Expression (2) is satisfied, a retrofocus-type refractive power arrangement can be easily obtained at the wide angle end. Further, a wide angle of view can be obtained at the wide angle end, and high optical performance can be easily obtained in the entire screen with less variation in various aberrations over the entire zoom range.

When a ratio exceeds the upper limit of Conditional Expression (2) and the negative refractive power of the second lens unit becomes weaker (absolute value of the negative refractive power becomes smaller), it becomes difficult to obtain the retrofocus-type refractive power arrangement, and it also becomes difficult to increase an image pickup angle of view at the wide angle end. When the ratio falls below the lower limit of Conditional Expression (2) and the negative refractive power of the second lens unit is excessively increased (absolute value of the negative refractive power is excessively increased), it becomes difficult to reduce the variations in spherical aberration and lateral chromatic aberration accompanying zooming. Moreover, the second lens unit L2 exhibits an excessively large action of dispersing the axial ray, and hence it becomes difficult to downsize the lens unit subsequent thereto.

Conditional Expression (3) is given to appropriately set the position of the lens unit LP on the optical axis at the telephoto end. When Conditional Expression (3) is satisfied, the lens unit LP is arranged at a position close to the image plane at the telephoto end, and the effective diameters of the image stabilizing lens system IS and the focus lens system LF, which are arranged on the object side of the lens unit LP, can be easily reduced. When a ratio falls below the lower limit of Conditional Expression (3) and the distance between the lens unit LP and the image plane is excessively reduced, it becomes difficult to reduce the effective diameter of a rear lens element at the telephoto end. Further, it becomes difficult to suppress variations in exit pupil position during zooming from the wide angle end to the telephoto end.

When the ratio exceeds the upper limit of Conditional Expression (3) and the distance between the lens unit LP and the image plane is excessively increased, it becomes difficult to reduce the total length of zoom lens at the telephoto end.

It is preferred to set the numerical ranges of Conditional Expressions (1) to (3) as follows.

$$0.8 < f1/f2 < 1.1 \tag{1a}$$

$$0.7 < |f2/fw| < 0.9 \tag{2a}$$

$$0.20 < dLP/ft < 0.35 \tag{3a}$$

It is preferred that each Example satisfy at least one of the following conditional expressions. A focal length of the lens unit LP is represented by fLP. An interval between the first lens unit L1 and the second lens unit L2 at the telephoto end is represented by d12t. A distance on the optical axis from a lens surface closest to the object side of the second lens unit L2 to a lens surface closest to the image side of the second lens unit L2 is represented by d2.

An amount of movement of the second lens unit L2 during zooming from the wide angle end to the telephoto end is represented by m2. The amount of movement of the lens unit during zooming from the wide angle end to the telephoto end herein refers to a difference between a position of the lens unit on the optical axis at the wide angle end and a position of the lens unit on the optical axis at the telephoto end. The sign of the amount of movement is positive when the lens unit is positioned closer to the image side at the telephoto end as compared to the wide angle end, and is negative when the lens unit is positioned closer to the object side at the telephoto end as compared to the wide angle end. An amount of movement of the first lens unit L1 during zooming from the wide angle end to the telephoto end is represented by m1. An F-number at the telephoto end is represented by Fnot.

When the zoom lens according to each Example of the present invention is applied to an image pickup apparatus including an image pickup element, the maximum height of incidence of an axial ray or an off-axial ray passing through a lens surface closest to the object side of the lens unit LP during zooming from the wide angle end to the telephoto end is represented by "hgt". That is, the maximum height of incidence "hgt" is the maximum distance from the optical axis of the zoom lens to a position at which the axial ray or the off-axial ray passes through the lens surface of the lens unit LP. A half of a diagonal length of an effective image pickup surface of the image pickup element is represented by Ymax.

At this time, it is preferred to satisfy at least one of the following conditional expressions.

$$0.3 < fLP/ft < 1.0 \tag{4}$$

$$0.2 < d12t/ft < 0.5 \tag{5}$$

$$0.6 < |d2/f2| < 1.2 \tag{6}$$

$$0.01 < |m2/ft| < 0.20 \tag{7}$$

$$0.05 < m2/m1 < 0.40 \tag{8}$$

$$0.7 < Fnot/(ft/fw) < 1.4 \tag{9}$$

$$3.0 < (hgt \times Fnot)/Y\max < 5.5 \tag{10}$$

Next, technical meanings of the above-mentioned conditional expressions are described. Conditional Expression (4) is given to appropriately set the focal length of the lens unit LP having a positive refractive power, which is arranged closest to the image side. When Conditional Expression (4) is satisfied, the effective diameters of the image stabilizing lens system IS and the focus lens system LF, which are arranged on the object side of the lens unit LP, are easily reduced.

When a ratio exceeds the upper limit of Conditional Expression (4), the positive refractive power of the lens unit LP is excessively decreased, and it becomes difficult to reduce the effective diameters of the image stabilizing lens system IS and the focus lens system LF, which are arranged on the object side of the lens unit LP. When the ratio falls below the lower limit of Conditional Expression (4), the positive refractive power of the lens unit LP is excessively increased, and it becomes difficult to correct a field curvature and a distortion at the wide angle end.

Conditional Expression (5) is given to appropriately set the interval between the first lens unit L1 and the second lens unit L2 at the telephoto end. When Conditional Expression (5) is satisfied, the effective diameter of each lens unit forming the rear unit LB can be easily reduced.

When a ratio exceeds the upper limit of Conditional Expression (5) and the interval between the first lens unit L1 and the second lens unit L2 is excessively increased, the effective diameter of the front lens element is increased in order to ensure the surrounding light amount at the telephoto end. Further, when the ratio falls below the lower limit of Conditional Expression (5) and the interval between the first lens unit L1 and the second lens unit L2 is excessively decreased, it becomes difficult to reduce variations in spherical aberration and lateral chromatic aberration accompanying zooming. Further, the total length of zoom lens at the wide angle end is increased, and it becomes difficult to reduce the effective diameter of the front lens element at the wide angle end.

Conditional Expression (6) is given to appropriately set the thickness (lens unit thickness) of the second lens unit L2. When Conditional Expression (6) is satisfied, the effective diameter of each lens unit forming the rear unit LB can be easily reduced. When a ratio exceeds the upper limit of Conditional Expression (6) and the thickness of the second lens unit L2 is excessively increased, it becomes difficult to reduce the effective diameter of each lens unit forming the rear unit LB. When the ratio falls below the lower limit of Conditional Expression (6) and the thickness of the second lens unit L2 is excessively decreased, it becomes difficult to correct a field curvature at the wide angle end and a spherical aberration at the telephoto end.

Conditional Expression (7) is given to appropriately set the amount of movement of the second lens unit L2 during zooming. When Conditional Expression (7) is satisfied, the total length of zoom lens at the wide angle end can be easily reduced. When a ratio exceeds the upper limit of Conditional Expression (7) and the amount of movement of the second lens unit L2 during zooming is excessively increased, it becomes difficult to reduce the total length of zoom lens at the telephoto end. When the ratio falls below the lower limit of Conditional Expression (7) and the amount of movement of the second lens unit L2 during zooming is excessively decreased, it becomes difficult to reduce variations in spherical aberration and lateral chromatic aberration accompanying zooming. Further, the total length of zoom lens at the wide angle end is increased, and it becomes difficult to reduce the effective diameter of the front lens element at the wide angle end.

Conditional Expression (8) is given to appropriately set a ratio of the amount of movement of the second lens unit L2 to the amount of movement of the first lens unit L1 during zooming. When the ratio exceeds the upper limit of Conditional Expression (8) and the amount of movement of the second lens unit L2 is excessively increased, it becomes difficult to reduce variations in spherical aberration and lateral chromatic aberration accompanying zooming. Further, the total length of zoom lens at the wide angle end is increased, and it becomes difficult to reduce the effective diameter of the front lens element at the wide angle end. When the ratio falls below the lower limit of Conditional Expression (8) and the amount of movement of the first lens unit L1 is excessively increased, the effective diameter of the front lens element is disadvantageously increased in order to ensure the surrounding light amount at the telephoto end.

Conditional Expression (9) defines a relationship between the F-number and the zoom ratio at the wide angle end. When a ratio falls below the lower limit of Conditional Expression (9) and the F-number is excessively decreased with respect to the zoom ratio, a large spherical aberration occurs due to the third lens unit L3, and it becomes difficult to maintain high optical performance over the entire zoom range. Further, when the ratio exceeds the upper limit of Conditional Expression (9) and the F-number is excessively increased with respect to the zoom ratio, it becomes difficult to increase the zoom ratio and the aperture ratio.

Conditional Expression (10) defines a relationship between the size of the image pickup element at the time when the zoom lens is used in the image pickup apparatus, and the F-number at the telephoto end and the effective diameter "hgt" of the lens closest to the object side of the rear unit LB. When a ratio falls below the lower limit of Conditional Expression (10) and the effective diameter of the lens closest to the object side of the rear unit LB is excessively decreased, it becomes difficult to ensure a sufficient effective diameter with respect to an axial ray at a small F-number, and it becomes difficult to increase the aperture ratio.

Further, when the ratio exceeds the upper limit of Conditional Expression (10) and the effective diameter of the lens closest to the object side of the rear unit LB is excessively increased, a large spherical aberration occurs due to the lens closest to the object side of the rear unit LB, and it becomes difficult to correct a spherical aberration in the entire system of the zoom lens. It further becomes difficult to obtain high optical performance while increasing the aperture ratio.

In each Example, it is more preferred to set the numerical ranges of Conditional Expressions (4) to (10) as follows.

$$0.5 < fLP/ft < 0.9 \quad (4a)$$

$$0.25 < d12t/ft < 0.40 \quad (5a)$$

$$0.70 < |d2/f2| < 1.15 \quad (6a)$$

$$0.02 < |m2/ft| < 0.15 \quad (7a)$$

$$0.05 < m2/m1 < 0.3 \quad (8a)$$

$$0.7 < Fnot/(ft/fw) < 1.3 \quad (9a)$$

$$3.5 < (hgt \times Fnot)/Y\max < 5.0 \quad (10a)$$

As described above, according to each Example, it is possible to obtain a zoom lens including a mechanism for image blur compensation (image stabilization) and a downsized and light-weight focus lens system, and being capable of downsizing the entire zoom lens while the zoom lens has a large aperture and a small F-number at the telephoto end. In each Example, all lens units forming the rear unit LB are arranged on the image side of the stop SP, but an application range of Examples is not limited thereto. A part of the lens units forming the rear unit LB may be arranged between the second lens unit L2 and the stop SP.

Next, one embodiment of the present invention, which uses the zoom lens according to one of Examples of the present invention as an image pickup optical system, is described with reference to FIG. 9. In FIG. 9, an image pickup apparatus 10 according to an exemplary embodiment of the present invention includes an image pickup optical system 11 consisting of the zoom lens of one of Examples described above, a solid-state image pickup element 12 (photoelectric conversion element) such as a CCD sensor or a CMOS sensor, which is configured to receive light of an object image formed by the image pickup optical system 11, a recording unit 13 configured to record data on the object image received by the image pickup element 12, and a finder 14 to be used to observe the object image displayed on a display element (not shown). The display element consists of a liquid crystal panel or the like. The object image formed on the image pickup element 12 is displayed on the display element.

An image pickup apparatus having high optical performance can be implemented by applying the zoom lens according to one of Examples to the image pickup apparatus, for example, a digital camera, in such a manner. The zoom lens according to each Example can be similarly applied to a single-lens reflex (SLR) camera without a quick return mirror. Further, the zoom lens according to each Example can be similarly applied to a video camera.

Exemplarily Examples and embodiments of the present invention are described above, but the present invention is not limited to those Examples and embodiments and can be modified and changed variously within the scope of the gist thereof.

Next, Numerical Data 1 to 4 corresponding to Examples 1 to 4, respectively, are described. In each of Numerical Data, symbol i represents the order of a surface counted from the object side, symbol ri represents a curvature radius of an i-th lens surface, symbol di represents a lens thickness or an air gap between an i-th surface and the (i+1)th surface, and symbols ndi and vdi represent a refractive index and an Abbe number of a material of a lens between the i-th surface and the (i+1)th surface at the d-line, respectively.

Further, an aspherical shape is represented as follows:

$$x = (h^2/R)/[1+[1-(1+k)(h/R)^2]^{1/2}] + A4h^4 + A6h^6 + A8h^8 + A10h^{10} + A12h^{12},$$

where R represents a paraxial curvature radius, "k" represents an eccentricity, A4, A6, A8, A10, and A12 represent aspherical coefficients, and "x" represents a displacement in the optical axis direction from a surface vertex at a position of a height "h" from the optical axis. The notation "e-x" means "$10^{-x}$".

In each of Examples, back focus (BF) corresponds to a distance from a lens final surface to a paraxial image plane. A total length of zoom lens is a value obtained by adding the back focus to a distance from a lens surface closest to the object side to the final lens surface. Moreover, correspondence between the conditional expressions given above and the corresponding values in each of Examples is shown in Table 1.

Numerical Example 1

Unit: mm

Surface data

| Surface number | r | d | nd | vd | Effective diameter |
|---|---|---|---|---|---|
| 1 | 360.812 | 1.80 | 1.84666 | 23.8 | 62.80 |
| 2 | 102.577 | 6.64 | 1.72916 | 54.7 | 60.93 |
| 3 | −772.618 | 0.15 | | | 60.54 |
| 4 | 54.305 | 6.51 | 1.72916 | 54.7 | 55.83 |
| 5 | 145.050 | (Variable) | | | 54.70 |
| 6* | 195.122 | 1.80 | 1.76802 | 49.2 | 36.16 |
| 7 | 15.928 | 10.58 | | | 25.29 |
| 8 | −25.140 | 0.90 | 1.49700 | 81.5 | 23.93 |
| 9 | −208.718 | 0.15 | | | 23.27 |
| 10 | 47.367 | 2.32 | 1.89286 | 20.4 | 22.65 |
| 11 | 190.240 | (Variable) | | | 22.14 |
| 12 (Stop) | ∞ | 0.50 | | | 18.72 |
| 13 | 18.368 | 0.80 | 1.88300 | 40.8 | 20.01 |
| 14 | 13.125 | 7.95 | 1.58313 | 59.4 | 19.19 |
| 15* | −57.788 | 0.99 | | | 18.82 |
| 16 | −87.965 | 0.80 | 1.76200 | 40.1 | 18.45 |
| 17 | 16.252 | 3.22 | 2.00069 | 25.5 | 18.08 |
| 18 | 34.593 | 1.40 | | | 17.70 |
| 19 | 15.903 | 0.80 | 2.00100 | 29.1 | 17.88 |
| 20 | 11.311 | 6.81 | 1.53775 | 74.7 | 16.78 |
| 21 | 6,552.763 | 0.15 | | | 16.11 |
| 22 | 39.790 | 0.80 | 1.85478 | 24.8 | 15.80 |
| 23 | 19.824 | 4.52 | 1.58313 | 59.4 | 15.92 |
| 24* | −36.018 | (Variable) | | | 16.42 |
| 25 | 64.857 | 0.80 | 1.57250 | 57.7 | 17.03 |
| 26 | 16.869 | (Variable) | | | 17.11 |
| 27* | −20.265 | 1.50 | 1.58313 | 59.4 | 22.44 |
| 28* | −77.916 | (Variable) | | | 27.23 |
| 29 | −98.804 | 5.29 | 1.88300 | 40.8 | 35.44 |
| 30 | −34.131 | (Variable) | | | 36.52 |
| Image plane | ∞ | | | | |

Aspherical surface data

Sixth surface

| K = 0.00000e+000 | A4 = 7.28875e−006 | A6 = −2.03079e−008 |
| A8 = 6.78458e−011 | A10 = −1.61143e−013 | A12 = 1.59482e−016 |

Fifteenth surface

| K = 0.00000e+000 | A4 = 2.25823e−005 | A6 = −4.01819e−008 |
| A8 = −1.92298e−010 | A10 = 3.85842e−013 | |

Twenty-fourth surface

| K = 0.00000e+000 | A4 = 4.03627e−005 | A6 = 2.28646e−008 |
| A8 = 1.73530e−010 | A10 = −8.03393e−012 | |

Twenty-seventh surface

| K = 0.00000e+000 | A4 = −9.10759e−006 | A6 = −3.96094e−007 |
| A8 = 1.03168e−009 | A10 = 4.30404e−012 | A12 = −1.28909e−013 |

Twenty-eighth surface

| K = 0.00000e+000 | A4 = −1.23220e−005 | A6 = −2.88150e−007 |
| A8 = 2.01026e−009 | A10 = −1.01180e−011 | A12 = 1.58725e−014 |

Various data
Zoom ratio 4.12

| | Wide angle | Intermediate | Telephoto |
|---|---|---|---|
| Focal length | 24.72 | 57.08 | 101.89 |
| F-number | 4.12 | 4.12 | 4.12 |
| Half angle of view (degrees) | 41.19 | 20.76 | 11.99 |
| Image height | 21.64 | 21.64 | 21.64 |
| Total length of zoom lens | 120.52 | 140.11 | 159.71 |
| BF | 13.52 | 18.44 | 26.90 |
| d5 | 0.70 | 18.51 | 35.81 |
| d11 | 24.20 | 9.43 | 2.38 |
| d24 | 1.58 | 2.26 | 0.96 |
| d26 | 12.56 | 11.89 | 13.18 |
| d28 | 0.78 | 12.42 | 13.30 |
| d30 | 13.52 | 18.44 | 26.90 |

Zoom lens unit data

| Unit | First surface | Focal length |
|---|---|---|
| 1 | 1 | 92.83 |
| 2 | 6 | −20.76 |
| 3 | 12 | 22.08 |
| 4 | 25 | −40.07 |
| 5 | 27 | −47.42 |
| 6 | 29 | 56.87 |

Numerical Example 2

Unit: mm

Surface data

| Surface number | r | d | nd | vd | Effective diameter |
|---|---|---|---|---|---|
| 1 | 266.275 | 1.80 | 1.80810 | 22.8 | 63.00 |
| 2 | 93.368 | 6.52 | 1.72916 | 54.7 | 61.29 |
| 3 | ∞ | 0.15 | | | 60.87 |
| 4 | 49.826 | 6.97 | 1.72916 | 54.7 | 55.94 |
| 5 | 126.155 | (Variable) | | | 54.73 |
| 6 | 65.832 | 1.25 | 1.95375 | 32.3 | 31.37 |
| 7 | 15.019 | 8.19 | | | 23.43 |
| 8* | −33.476 | 1.10 | 1.58313 | 59.4 | 22.88 |
| 9* | 65.137 | 0.15 | | | 21.96 |
| 10 | 40.325 | 5.03 | 1.80810 | 22.8 | 21.71 |
| 11 | −40.325 | 0.97 | | | 20.83 |
| 12 | −25.491 | 1.00 | 1.80400 | 46.6 | 20.55 |
| 13 | −63.435 | (Variable) | | | 20.09 |
| 14 (Stop) | ∞ | 0.30 | | | 19.35 |
| 15 | 44.965 | 2.30 | 1.91082 | 35.3 | 19.94 |
| 16 | ∞ | 0.15 | | | 19.93 |
| 17 | 21.533 | 1.00 | 1.95375 | 32.3 | 19.90 |
| 18 | 13.108 | 6.76 | 1.59522 | 67.7 | 18.66 |
| 19 | −795.231 | 1.37 | | | 18.10 |
| 20 | −152.936 | 0.80 | 1.74951 | 35.3 | 17.70 |
| 21 | 16.038 | 2.88 | 2.00069 | 25.5 | 17.20 |
| 22 | 30.717 | 3.81 | | | 16.77 |
| 23 | 76.401 | 0.75 | 1.78472 | 25.7 | 16.79 |
| 24 | 19.110 | 3.57 | 1.49700 | 81.5 | 16.59 |
| 25 | ∞ | 0.15 | | | 16.72 |

-continued

Unit: mm

| | | | | | |
|---|---|---|---|---|---|
| 26* | 24.461 | 7.26 | 1.58313 | 59.4 | 18.62 |
| 27* | −25.212 | (Variable) | | | 19.76 |
| 28 | 121.315 | 0.75 | 1.72916 | 54.7 | 19.99 |
| 29 | 23.846 | (Variable) | | | 19.90 |
| 30* | −43.071 | 1.50 | 1.76450 | 49.1 | 24.17 |
| 31* | −248.821 | (Variable) | | | 27.13 |
| 32 | −68.116 | 4.50 | 1.80400 | 46.6 | 35.10 |
| 33 | −32.318 | (Variable) | | | 36.00 |
| Image plane | ∞ | | | | |

Aspherical surface data

Eighth surface

K = 0.00000e+000
A4 = 5.17863e−006
A6 = −6.74704e−008
A8 = 5.22888e−010
A10 = −4.25942e−012
A12 = 1.45835e−014

Ninth surface

K = 0.00000e+000
A4 = −7.77410e−006
A6 = −4.92259e−008

Twenty-sixth surface

K = 0.00000e+000
A4 = −2.73692e−005
A6 = 5.32572e−008
A8 = −8.44820e−010
A10 = 5.56287e−012

Twenty-seventh surface

K = 0.00000e+000
A4 = 1.47893e−005
A6 = 2.32565e−009
A8 = −6.75778e−010
A10 = 4.79574e−012

Thirtieth surface

K = 0.00000e+000
A4 = −8.05959e−005
A6 = 1.99191e−007
A8 = −1.06561e−009
A10 = −7.47195e−013
A12 = 8.67762e−015

Thirty-first surface

K = 0.00000e+000
A4 = −7.18829e−005
A6 = 2.81391e−007
A8 = −1.44320e−009
A10 = 4.20650e−012
A12 = −5.37088e−015

Various data
Zoom ratio 4.12

| | Wide angle | Intermediate | Telephoto |
|---|---|---|---|
| Focal length | 24.72 | 50.92 | 101.84 |
| F-number | 4.12 | 4.12 | 4.12 |
| Half angle of view (degrees) | 41.19 | 23.02 | 11.99 |
| Image height | 21.64 | 21.64 | 21.64 |
| Total length of zoom lens | 125.34 | 142.50 | 169.34 |
| BF | 17.88 | 19.75 | 30.96 |
| d5 | 0.75 | 15.82 | 34.38 |
| d13 | 21.53 | 9.07 | 2.38 |
| d27 | 1.80 | 3.37 | 1.40 |
| d29 | 11.59 | 10.02 | 11.99 |
| d31 | 0.80 | 13.48 | 17.24 |
| d33 | 17.88 | 19.75 | 30.96 |

Zoom lens unit data

| Unit | First surface | Focal length |
|---|---|---|
| 1 | 1 | 88.25 |
| 2 | 6 | −18.38 |
| 3 | 14 | 24.16 |
| 4 | 28 | −40.84 |
| 5 | 30 | −68.35 |
| 6 | 32 | 72.42 |

Numerical Example 3

Unit: mm

Surface data

| Surface number | r | d | nd | vd | Effective diameter |
|---|---|---|---|---|---|
| 1 | 224.719 | 2.10 | 1.80810 | 22.8 | 63.00 |
| 2 | 102.980 | 5.57 | 1.65160 | 58.5 | 61.61 |
| 3 | 984.417 | 0.15 | | | 61.25 |
| 4 | 74.504 | 6.19 | 1.65160 | 58.5 | 58.87 |
| 5 | 333.377 | (Variable) | | | 58.06 |
| 6* | 73.051 | 1.50 | 1.85400 | 40.4 | 34.14 |
| 7* | 19.430 | 6.48 | | | 26.45 |
| 8 | −127.740 | 1.20 | 1.83481 | 42.7 | 25.62 |
| 9 | 16.660 | 7.19 | 1.85478 | 24.8 | 22.08 |
| 10 | −112.531 | 1.79 | | | 20.56 |
| 11 | −27.664 | 1.20 | 1.65160 | 58.5 | 19.95 |
| 12 | −215.194 | (Variable) | | | 21.24 |
| 13 (Stop) | ∞ | 0.39 | | | 23.21 |
| 14 | 29.749 | 5.05 | 1.59522 | 67.7 | 25.55 |
| 15 | −174.694 | 0.15 | | | 25.60 |
| 16 | 42.985 | 3.69 | 1.76802 | 49.2 | 25.51 |
| 17* | −394.873 | 2.77 | | | 25.09 |
| 18 | −39.498 | 1.20 | 1.95375 | 32.3 | 24.34 |
| 19 | 18.712 | 7.29 | 1.73800 | 32.3 | 24.44 |
| 20 | −697.962 | (Variable) | | | 25.09 |
| 21 | 27.190 | 5.96 | 1.59522 | 67.7 | 26.97 |
| 22 | −172.440 | 0.15 | | | 26.62 |
| 23 | 32.277 | 1.10 | 1.95375 | 32.3 | 25.32 |
| 24 | 16.349 | 8.09 | 1.62263 | 58.2 | 23.99 |
| 25* | −100.416 | (Variable) | | | 23.95 |
| 26 | −651.346 | 3.96 | 1.95375 | 32.3 | 23.98 |
| 27 | −29.290 | 1.50 | 1.85400 | 40.4 | 24.02 |
| 28* | 64.019 | (Variable) | | | 23.92 |
| 29 | −17.962 | 1.40 | 1.75500 | 52.3 | 26.22 |
| 30 | −43.617 | (Variable) | | | 30.42 |
| 31 | 126.723 | 3.35 | 2.00069 | 25.5 | 35.73 |
| 32 | −182.951 | (Variable) | | | 36.00 |
| Image plane | ∞ | | | | |

Aspherical surface data

Sixth surface

K = 0.00000e+000
A4 = 4.79357e−007
A6 = 3.22785e−008
A8 = −9.68674e−011
A10 = 1.16477e−013

Seventh surface

K = 0.00000e+000
A4 = −3.28962e−006
A6 = 3.96021e−008

Seventeenth surface

K = 0.00000e+000
A4 = −1.17933e−006
A6 = −1.29723e−008
A8 = −1.76069e−011
A10 = −4.18230e−014

Twenty-fifth surface

K = 0.00000e+000
A4 = 1.90607e−005
A6 = 9.25597e−009
A8 = −2.78303e−011
A10 = 4.15978e−013

-continued

Unit: mm

Twenty-eighth surface

| K = 0.00000e+000 | A4 = −9.94405e−007 | A6 = −4.67833e−009 |
|---|---|---|
| A8 = 3.39269e−011 | A10 = −1.85752e−013 | |

Various data
Zoom ratio 5.30

| | Wide angle | Intermediate | Telephoto |
|---|---|---|---|
| Focal length | 24.72 | 63.46 | 131.00 |
| F-number | 4.12 | 4.12 | 4.12 |
| Half angle of view (degrees) | 41.19 | 18.83 | 9.38 |
| Image height | 21.64 | 21.64 | 21.64 |
| Total length of zoom lens | 137.50 | 168.92 | 200.33 |
| BF | 13.50 | 24.03 | 28.27 |
| d5 | 0.70 | 25.31 | 49.50 |
| d12 | 18.61 | 7.01 | 2.50 |
| d20 | 8.09 | 3.83 | 1.00 |
| d25 | 1.50 | 2.34 | 1.50 |
| d28 | 15.19 | 19.61 | 26.29 |
| d30 | 0.50 | 7.37 | 11.86 |
| d32 | 13.50 | 24.03 | 28.27 |

Zoom lens unit data

| Unit | First surface | Focal length |
|---|---|---|
| 1 | 1 | 121.72 |
| 2 | 6 | −17.60 |
| 3 | 13 | 61.84 |
| 4 | 21 | 25.91 |
| 5 | 26 | −87.67 |
| 6 | 29 | −41.42 |
| 7 | 31 | 75.22 |

Numerical Example 4

Unit: mm

Surface data

| Surface number | r | d | nd | vd | Effective diameter |
|---|---|---|---|---|---|
| 1 | 177.187 | 1.90 | 1.80810 | 22.8 | 50.37 |
| 2 | 63.047 | 5.04 | 1.77250 | 49.6 | 48.36 |
| 3 | 249.446 | 0.15 | | | 47.82 |
| 4 | 54.422 | 5.24 | 1.80400 | 46.6 | 45.56 |
| 5 | 214.428 | (Variable) | | | 44.55 |
| 6* | 257.087 | 1.50 | 1.85400 | 40.4 | 31.22 |
| 7* | 17.642 | 5.70 | | | 23.53 |
| 8 | −118.867 | 1.20 | 1.83481 | 42.7 | 22.94 |
| 9 | 14.867 | 7.14 | 1.85478 | 24.8 | 20.27 |
| 10 | −93.813 | 1.41 | | | 19.00 |
| 11 | −27.152 | 1.20 | 1.65160 | 58.5 | 18.72 |
| 12 | −55.858 | (Variable) | | | 18.09 |
| 13 (Stop) | ∞ | 0.39 | | | 18.29 |
| 14 | 27.846 | 2.78 | 1.59522 | 67.7 | 19.32 |
| 15 | 176.809 | 0.15 | | | 19.33 |
| 16 | 34.874 | 3.07 | 1.76802 | 49.2 | 19.43 |
| 17* | −371.170 | 2.89 | | | 19.13 |
| 18 | −29.866 | 1.20 | 1.95375 | 32.3 | 18.26 |
| 19 | 17.120 | 5.01 | 1.73800 | 32.3 | 18.64 |
| 20 | −458.237 | (Variable) | | | 19.18 |
| 21 | 21.919 | 4.66 | 1.59522 | 67.7 | 20.70 |
| 22 | −182.084 | 0.15 | | | 20.42 |
| 23 | 24.989 | 1.10 | 1.95375 | 32.3 | 20.98 |
| 24 | 13.280 | 7.17 | 1.62263 | 58.2 | 19.86 |
| 25* | −100.486 | (Variable) | | | 19.90 |
| 26 | −222.907 | 3.49 | 1.95375 | 32.3 | 20.10 |
| 27 | −24.089 | 1.50 | 1.85400 | 40.4 | 20.27 |
| 28* | 85.760 | (Variable) | | | 20.60 |
| 29 | −14.291 | 1.40 | 1.75500 | 52.3 | 23.16 |
| 30 | −30.998 | (Variable) | | | 27.83 |
| 31 | 93.306 | 3.41 | 2.00069 | 25.5 | 35.33 |
| 32 | −316.083 | (Variable) | | | 35.60 |
| Image plane | ∞ | | | | |

Aspherical surface data

Sixth surface

| K = 0.00000e+000 | A4 = 9.37797e−006 | A6 = 5.01693e−009 |
|---|---|---|
| A8 = −6.25017e−011 | A10 = 9.83380e−014 | |

Seventh surface

| K = 0.00000e+000 | A4 = 6.31548e−007 | A6 = 4.85515e−008 |
|---|---|---|

Seventeenth surface

| K = 0.00000e+000 | A4 = −1.01288e−005 | A6 = −4.65453e−008 |
|---|---|---|
| A8 = 8.05698e−011 | A10 = −4.97844e−013 | |

Twenty-fifth surface

| K = 0.00000e+000 | A4 = 3.91525e−005 | A6 = 5.89636e−008 |
|---|---|---|
| A8 = −6.27947e−010 | A10 = 5.73896e−012 | |

Twenty-eighth surface

| K = 0.00000e+000 | A4 = −2.28876e−006 | A6 = −2.79288e−008 |
|---|---|---|
| A8 = 3.42276e−010 | A10 = −2.16051e−012 | |

Various data
Zoom ratio 3.34

| | Wide angle | Intermediate | Telephoto |
|---|---|---|---|
| Focal length | 24.72 | 48.09 | 82.45 |
| F-number | 4.12 | 4.12 | 4.12 |
| Half angle of view (degrees) | 41.19 | 24.22 | 14.70 |
| Image height | 21.64 | 21.64 | 21.64 |
| Total length of zoom lens | 119.50 | 134.52 | 149.55 |
| BF | 13.50 | 18.71 | 22.73 |
| d5 | 0.70 | 13.84 | 25.21 |
| d12 | 15.30 | 7.13 | 2.50 |
| d20 | 4.46 | 2.57 | 1.00 |
| d25 | 1.50 | 1.80 | 1.50 |
| d28 | 14.70 | 16.08 | 18.51 |
| d30 | 0.50 | 5.55 | 9.25 |
| d32 | 13.50 | 18.71 | 22.73 |

Zoom lens unit data

| Unit | First surface | Focal length |
|---|---|---|
| 1 | 1 | 83.58 |
| 2 | 6 | −17.59 |
| 3 | 13 | 124.73 |
| 4 | 21 | 21.07 |
| 5 | 26 | −98.61 |
| 6 | 29 | −36.43 |
| 7 | 31 | 72.29 |

TABLE 1

| Conditional Expression | | Example 1 | Example 2 | Example 3 | Example 4 |
|---|---|---|---|---|---|
| (1) | f1/ft | 0.911 | 0.867 | 0.929 | 1.014 |
| (2) | \|f2/fw\| | 0.840 | 0.743 | 0.712 | 0.712 |
| (3) | dLP/ft | 0.264 | 0.304 | 0.216 | 0.276 |
| (4) | fLP/ft | 0.558 | 0.711 | 0.574 | 0.877 |
| (5) | d12t/ft | 0.351 | 0.338 | 0.378 | 0.306 |
| (6) | \|d2/f2\| | 0.759 | 0.963 | 1.100 | 1.032 |
| (7) | \|m2/ft\| | 0.040 | 0.102 | 0.107 | 0.067 |
| (8) | m2/m1 | 0.104 | 0.236 | 0.223 | 0.184 |
| (9) | Fnot/(ft/fw) | 1.000 | 1.000 | 0.777 | 1.235 |
| (10) | (hgt × Fnot)/Ymax | 3.810 | 3.798 | 4.865 | 3.680 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-130185, filed Jul. 3, 2017, which is hereby incorporated by reference herein in its entirety.

What is claimed is:

1. A zoom lens having a configuration that an interval between each pair of adjacent lens units is changed during zooming, the zoom lens comprising, in order from an object side to an image side:
a first lens unit having a positive refractive power;
a second lens unit having a negative refractive power; and
a rear unit including at least four lens units and having a positive refractive power as a whole,
wherein the second lens unit is configured to move toward the object side monotonically during zooming from a wide angle end to a telephoto end,
wherein the rear unit includes a lens unit LP having a positive refractive power, which is arranged closest to the image side of the zoom lens, and
wherein the following conditional expressions are satisfied:

$0.7 < f1/ft < 1.2;$ $0.7 < |f2/fw| < 1.0;$ $0.1 < dLP/ft < 0.4;$ and $0.3 < fLP/ft < 1.0,$ where fw represents a focal length of the zoom lens at the wide angle end, ft represents a focal length of the zoom lens at the telephoto end, f1 represents a focal length of the first lens unit, f2 represents a focal length of the second lens unit, dLP represents a distance from a lens surface of the lens unit LP on the image side to an image plane at the telephoto end, and fLP represents a focal length of a whole of the lens unit LP.

2. A zoom lens according to claim 1, wherein the following conditional expression is satisfied:

$0.2 < d12t/ft < 0.5,$ where d12t represents an interval between the first lens unit and the second lens unit at the telephoto end.

3. A zoom lens according to claim 1, wherein the following conditional expression is satisfied:

$0.6 < |d2/f2| < 1.2,$ where d2 represents a distance on an optical axis from a lens surface closest to the object side of the second lens unit to a lens surface closest to the image side of the second lens unit.

4. A zoom lens according to claim 1,
wherein the following conditional expression is satisfied:

$0.01 < |m2/ft| < 0.20,$ where m2 represents an amount of movement of the second lens unit during zooming from the wide angle end to the telephoto end, and
wherein a sign of m2 is positive when the second lens unit is positioned closer to the image side at the telephoto end as compared to the wide angle end, and the sign of m2 is negative when the second lens unit is positioned closer to the object side at the telephoto end as compared to the wide angle end.

5. A zoom lens according to claim 1,
wherein the following conditional expression is satisfied:

$0.05 < m2/m1 < 0.40,$ where m1 Represents an amount of movement of the first lens unit during zooming from the wide angle end to the telephoto end, and m2 represents an amount of movement of the second lens unit during zooming from the wide angle end to the telephoto end, and
wherein a sign of each of m1 and m2 is positive when a corresponding one of the first lens unit and the second lens unit is positioned closer to the image side at the telephoto end as compared to the wide angle end, and the sign of each of m1 and m2 is negative when the corresponding one of the first lens unit and the second lens unit is positioned closer to the object side at the telephoto end as compared to the wide angle end.

6. A zoom lens according to claim 1, wherein the following conditional expression is satisfied:

$0.7 < Fnot/(ft/fw) < 1.4,$ where Fnot represents an F-number at the telephoto end.

7. A zoom lens according to claim 1, wherein the rear unit consists of, in order from the object side to the image side, a third lens unit having a positive refractive power, a fourth lens unit having a negative refractive power, a fifth lens unit having a negative refractive power, and a sixth lens unit having a positive refractive power.

8. A zoom lens according to claim 1, wherein the rear unit consists of, in order from the object side to the image side, a third lens unit having a positive refractive power, a fourth lens unit having a positive refractive power, a fifth lens unit having a negative refractive power, a sixth lens unit having a negative refractive power, and a seventh lens unit having a positive refractive power.

9. A zoom lens according to claim 1, wherein the rear unit includes a focus lens system having a negative refractive power, which is configured to move toward the image side during focusing from infinity to close distance.

10. A zoom lens according to claim 1, wherein the rear unit includes an image stabilizing lens system configured to move so as to contain a component in a direction perpendicular to an optical axis during image blur correction.

11. An image pickup apparatus comprising:
a zoom lens; and
an image pickup element configured to receive light of an image formed by the zoom lens, wherein the zoom lens is a zoom lens having a configuration that an interval between each pair of adjacent lens units is changed during zooming, the zoom lens including, in order from an object side to an image side:
a first lens unit having a positive refractive power;
a second lens unit having a negative refractive power; and
a rear unit including at least four lens units and having a positive refractive power as a whole,
wherein the second lens unit is configured to move toward the object side monotonically during zooming from a wide angle end to a telephoto end,
wherein the rear unit includes a lens unit LP having a positive refractive power, which is arranged closest to the image side of the zoom lens, and
wherein the following conditional expressions are satisfied:

$0.7 < f1/ft < 1.2;$ $0.7 < |f2/fw| < 1.0;$ $0.1 < dLP/ft < 0.4;$ and $0.3 < fLP/ft < 1.0,$ where fw represents a focal length of the zoom lens at the wide angle end, ft represents a focal length of the zoom lens at the telephoto end, f1 represents a focal length of the first lens unit, f2 represents a focal length of the second lens unit, dLP represents a distance from a lens surface of the lens unit LP on the image side to an image plane at the telephoto end, and fLP represents a focal length of a whole of the lens unit LP.

12. An image pickup apparatus according to claim 11, wherein the following conditional expression is satisfied:

$3.0 < (hgt \times Fnot)/Y\max < 5.5,$ where Fnot represents an F-number at the telephoto end, hgt represents a maximum height of incidence of one of an axial ray and an off-axial ray passing through a lens surface closest to the object side of the lens unit LP during zooming from the wide angle end to the telephoto end, and Ymax represents a half of a diagonal length of an effective image pickup surface of the image pickup element.

* * * * *